United States Patent [19]

Kurschner et al.

[11] Patent Number: 5,632,676
[45] Date of Patent: May 27, 1997

[54] USE OF PERACETIC ACID TO SANITIZE PROCESSED FOWL

[75] Inventors: Lisa M. Kurschner; George M. Diken, both of Hamilton Square, N.J.

[73] Assignee: FMC Corporation, Philadelphia, Pa.

[21] Appl. No.: 134,995

[22] Filed: Oct. 12, 1993

[51] Int. Cl.$^6$ .............................. A23L 1/015; A23L 1/315
[52] U.S. Cl. .................. 452/173; 452/74; 452/77; 426/332
[58] Field of Search ................ 452/173, 71, 74, 452/77, 78; 426/332

[56] References Cited

U.S. PATENT DOCUMENTS

| | | | |
|---|---|---|---|
| 2,512,640 | 6/1950 | Greenspan et al. | 99/154 |
| 2,590,856 | 4/1952 | Greenspan et al. | 260/502 |
| 2,609,391 | 9/1952 | Greenspan et al. | 260/502 |
| 2,735,777 | 2/1956 | Meyer | 99/111 |
| 3,122,417 | 2/1964 | Blaser et al. | 23/207.5 |
| 3,934,044 | 1/1976 | Busch et al. | 426/332 |
| 4,051,058 | 9/1977 | Bowing et al. | 424/130 |
| 4,051,059 | 9/1977 | Bowing et al. | 424/130 |
| 4,297,298 | 10/1981 | Crommelynck et al. | 260/502 |
| 4,743,447 | 5/1988 | Le Rouzic et al. | 424/130 |
| 4,766,646 | 8/1988 | Parker | 426/332 |
| 4,770,884 | 9/1988 | Hill et al. | 426/332 |
| 4,849,237 | 7/1989 | Hurst | 420/332 |
| 4,852,216 | 8/1989 | Clayton et al. | 426/332 |
| 4,865,855 | 9/1989 | Hansen et al. | 426/124 |
| 4,999,202 | 3/1991 | Cronje et al. | 426/332 |
| 5,093,140 | 3/1992 | Watanabe | 426/332 |
| 5,139,788 | 8/1992 | Schmidt | 424/616 |
| 5,143,739 | 9/1992 | Bender et al. | 426/332 |
| 5,178,890 | 1/1993 | van den Nieuwelaar et al. | 426/332 |
| 5,200,189 | 4/1993 | Oakes et al. | 424/405 |
| 5,208,057 | 5/1993 | Greenley et al. | 426/332 |
| 5,350,563 | 9/1994 | Kralovic et al. | 422/28 |
| 5,435,808 | 7/1995 | Holzhauer et al. | 8/94.18 |

FOREIGN PATENT DOCUMENTS

WO9107375  5/1991  WIPO .

*Primary Examiner*—Willis Little
*Attorney, Agent, or Firm*—Anthony L. Cupoli; Patrick C. Baker; Robert L. Andersen

[57] ABSTRACT

A method for sanitizing a fowl that has been defeathered and eviscerated by contacting the fowl with peracetic acid solution containing from 100 to 2000 ppm peracetic acid. Completely contacting the fowl with peracetic acid solution effectively reduces the bacterial level found on the fowl to a level that will not produce disease in human beings.

8 Claims, No Drawings

USE OF PERACETIC ACID TO SANITIZE PROCESSED FOWL

FIELD OF THE INVENTION

The invention relates to the sanitization of fowl; more particularly, it relates to the sanitization of processed fowl, such as turkeys and chickens, which have been defeathered and eviscerated.

BACKGROUND OF THE INVENTION

The processing of live fowl to produce packaged fowl ready for use by restaurants or other consumers typically entails stunning, killing, beheading, bleeding, scalding, plucking, eviscerating, washing, chilling, and packing the fowl for shipment to the consumer. During processing the opportunity for disease transmission is great. At existing processing rates of from 50 to more than 90 birds per minute, disease transmission occurs when the blood, guts and fecal matter of disease carrying birds are splattered onto noncontaminated birds. Disease transmission also arises because the equipment is shared by all the birds, with every bird being eviscerated with the same blade and cooled in the same communal chilling tank. Thus the problem of disease transmission is pervasive, with studies showing that 60% of the fowl processed in the United States is contaminated with pathogenic bacteria.

A number of methods have been used to solve this problem. These usually involve treatment at the chiller water stage, since by that stage all extraneous matter, such as fecal matter, blood, guts, and components of the digestive track of the bird, have been removed, thus decreasing the likelihood of further contamination past the chiller tank. Those treatment methods include raising the chiller water pH to levels that destroy bacteria or prevent their development, chlorinating the chiller water to kill the pathogenic organisms, and providing a chiller water having 3% hydrogen peroxide to retard microbial growth.

None of these is completely satisfactory; each has its own shortcoming, such as altering the color, taste, or texture of the flesh or of the skin. Hydrogen peroxide, for example, reacts with the enzyme catalase to produce a gas which becomes trapped in the tissue of the fowl, causing the fowl to have a bloated appearance. Moreover, the hydrogen peroxide can adversely affect the skin, either by bleaching it to an objectionable white color or by making it rubbery, or by doing both.

Another peroxide, peracetic acid has been used as a disinfectant for cleaning fowl processing equipment; it has also been used as a bactericide for killing the bacteria in the liquid soaked up by the absorbent pad in wrapped fowl packages, with a barrier layer between the peracetic acid and the fowl to keep the peracetic acid from contacting the fowl. Nevertheless, fowl has never been contacted directly with peracetic acid, perhaps because of an adverse experience with hydrogen peroxide.

SUMMARY OF THE INVENTION

We have discovered an extremely effective method for sanitizing a fowl carcass without unduly affecting the skin or the flesh of the bird carcass. In this method the fowl, which has been eviscerated and defeathered, is contacted with a peracetic acid solution containing an effective concentration of peracetic acid. The fowl is rapidly sanitized with no adverse affect on either the skin or the flesh of the bird. Because the peracetic acid decomposition products are safe for humans, excess peracetic acid can be left on the fowl to ensure sanitization.

DESCRIPTION OF THE PREFERRED EMBODIMENTS

In the specification and claims:

a) The term "about" shall be inferred when ranges, dosages, weight percent or other numerical designations are used, unless otherwise specified.

b) The terms "sanitize" and "sanitization" denote a bacterial population reduction to a level that is safe for human handling and consumption.

c) The term "PAA" denotes peracetic acid, which is also known as peroxyacetic acid.

d) The term "ppm" is a concentration term denoting the number of milligrams of a specified solute per one liter of solution.

e) The term "HOAc" denotes acetic acid.

In the process of this invention, a fowl that has been killed, defeathered and eviscerated is sanitized by contacting it with a dilute solution of peracetic acid. Generally, a peracetic acid solution containing from 100 to 2000 ppm peracetic acid is used; preferably, a peracetic acid solution containing from 100 to 1000 ppm peracetic acid is used; and most preferably, a peracetic acid solution containing from 100 to 750 ppm peracetic acid solution is used.

Peracetic acid solutions contain hydrogen peroxide because aqueous peracetic acid tends to establish an equilibrium with hydrogen peroxide. Thus, peracetic acid solutions normally are equilibrium solutions containing peracetic acid and hydrogen peroxide. In the case of newly generated peracetic acid, however the peracetic acid solutions may be used before equilibrium is established. This occurs, for instance, when peracetic acid is formed in situ at the site of treatment by reacting hydrogen peroxide with acetic acid. In both cases, some hydrogen peroxide is present in the solutions. Both equilibrium and non-equilibrium peracetic acid solutions can be used in the process of this invention.

The peracetic acid, not the hydrogen peroxide, is required for the sanitization process. The hydrogen peroxide is present because of the natural formation of an equilibrium solution with peracetic acid. Because of the equilibrium, the tendency of hydrogen peroxide to adversely affect the poultry at elevated hydrogen peroxide concentrations serves to limit the usable concentrations of peracetic acid.

These adverse affects can occur to the flesh or to the skin of the fowl, or to both. These affects can include bloating, discoloration (usually evidenced as a whitening), and a change in texture to either a rubbery or a leathery texture.

A variety of peracetic acid solution concentrations can be used without causing these adverse affects, as long as they don't contain a high concentration of hydrogen peroxide. On the one hand, peracetic acid concentrations greater than 2000 ppm can be effectively used without adversely affecting the fowl if the concentration of hydrogen peroxide is not excessive. Generally a hydrogen peroxide concentration that does not exceed 4000 ppm can be used without adverse affect; however, higher hydrogen peroxide concentrations may be usable depending on other factors. On the other hand, at extremely low peracetic acid concentrations, sanitization can still be effective if an extended contact time is used, and the hydrogen peroxide concentration is not excessive.

The peracetic acid can be prepared from commercially available stock solutions, such as either 5% or 35% stock solutions, that will generally have from 100 to 2000 ppm peracetic acid in equilibrium with from 19–4000 ppm hydrogen peroxide. From these commercially available stock solutions, peracetic acid dilutions can be made that include from 100–1000 ppm peracetic acid in equilibrium with from 19–500 ppm hydrogen peroxide. Also, from these commercially available stock solutions, peracetic acid dilutions can be made that include from 100 to 2000 ppm peracetic acid in equilibrium with from 19–4000 ppm hydrogen peroxide. Alternatively, peracetic acid dilutions can be made to include from 100–1000 ppm peracetic acid in equilibrium with from 19–500 ppm hydrogen peroxide. The relative concentrations of peracetic acid and hydrogen peroxide in any of these dilutions is dictated by their relative concentrations in the commercially available stock solution.

These stock solutions generally contain a stabilizer for the peracetic acid, such as 1-hydroxyethylidene-1,1-diphosphonic acid or dipicolinic acid. A variety of stabilizers are useful and include the phosphates, phosphonic acids and dipicolinic acids described in U.S. Pat. Nos. 2,590,856; 2,609,391; 3,122,417; 4,051,058; 4,297,298; in PCT Patent Publication WO 91/07375; and in other literature. The stabilizers may be added in any desirable amounts, for example about 0.1–10 wt % on total formulation, preferably s about 0.5–3 wt % on the same basis.

Peracetic acid solution can be applied to the fowl, such as by spraying a peracetic acid solution onto the fowl, immediately following its evisceration, or by dipping the fowl into a peracetic acid solution that is used as a chilling solution for cooling the birds to a temperature at which bacterial growth is retarded.

Typically, sanitization occurs substantially instantaneously at the peracetic acid concentrations described here. Thus, rapidly spraying the peracetic acid solution onto the bird, or quickly and momentarily dipping the bird into a container of peracetic acid solution will sanitize the bird. However, because of the many internal and external surfaces of the bird, application of the peracetic acid by dipping or spraying may not lead to immediate contact at all surface points, and the actual application time may be more protracted. Thus, the routine bacteriological tests that are conducted on processed fowl may suggest an actual application time equal to or greater than 0.5, 1, 5, 10, or 15 minutes, or an increase in peracetic acid concentration or that other efforts be taken to ensure a more complete contact of the peracetic acid with the fowl. That contact is at the surface(s) of the fowl.

Since peracetic acid rapidly reacts with any organic matter that may be present, such as blood, feces, and bacteria, it decomposes rapidly after it has been applied to the surface of the fowl. Thus, it is important to remember that the sanitization process used in fowl processing is not designed to kill 100% of the pathogens. It is designed to reduce the bacterial population to a level that the human body can process to prevent illness and disease symptoms. Consequently, the peracetic acid treated fowl should be kept at reduced temperatures to retard bacterial growth.

Because of this need to retard bacterial growth, the peracetic acid is usually applied to the bird at the chilling bath stage of poultry processing to reduce the body temperature of the bird to 40° F. (4.4° C.) or less.

If bloat, discoloration, or a change in the texture of the fowl should occur, it can be kept from recurring by reducing the peracetic acid concentration to lower the hydrogen peroxide concentration, by decreasing the residence time of the bird in the chiller tank, if that is where the peracetic acid is applied, by decreasing the spraying time, if that is the method by which the peracetic acid is applied, or by washing away the applied peracetic acid solution to reduce the contact time.

The following examples further illustrate the invention without limiting the scope thereof.

EXAMPLE 1

One liter equilibrium solutions of 100 ppm PAA, 500 ppm PAA, and 1000 ppm PAA were prepared by diluting with deionized water a solution of 5% peracetic acid having a nominal composition of 5.1% PAA, 21.7% $H_2O_2$, 10.4% HOAc, 62.8% water, and 0.7% 1-hydroxyethylidene-1,1-diphosphonic acid. These diluted solutions had the following approximate concentration of peracetic acid and hydrogen peroxide: 100 ppm PAA, 425 ppm $H_2O_2$; 500 ppm PAA, 2125 ppm $H_2O_2$; and 1000 ppm PAA, 4250 ppm $H_2O_2$. One percent hydrogen peroxide was used as a comparative and deionized water was used as a control. The pH of each was taken and recorded.

Nine chicken drumsticks purchased from a local grocery store were selected from a package of twenty-four Purdue brand drumsticks and were then matched as closely as possible for size and skin color. A set of two drumsticks was selected for each sample solution, with each set of drumsticks being completely submerged in its selected solution. Only one drumstick was placed in the deionized water control. The drumsticks were removed from the solutions after one minute. One drumstick from each set was immediately rinsed with deionized water, and the other remained unrinsed.

The drumsticks were then placed in individual plastic bags and refrigerated. Drumsticks were compared, initially and at intervals of 0.5, 1, 4, and 24 hours, for skin and meat color, skin texture, and bloating relative to the deionized water control.

In this and in the following examples, bloating, where it occurred, was, in some instances, evidenced by an increase in the size of the drumstick being tested and, in other instances, was more particularly evidenced by, not merely an increase in size, but by a localized bubbling of the flesh or skin. Bloating, sometimes referred to as swelling, is known to occur when hydrogen peroxide reacts with the enzyme catalase, which is found in fowl. Bloating was determined by visual inspection only, not by touch.

Skin texture, if unchanged by the testing, was not usually noted, but skin texture that did change was noted. The primary change in texture was a change to a rubbery texture. The terms "rubbery," "rubber-like," "like rubber," and "leathery" refer to the way the skin felt when touched, and do not refer to the way the skin looked.

The color of the skin or flesh of the fowl was generally noted only if there was a change. That change tended to be a bleaching affect, noted as either a whitening or a bleaching affect, or as a whitened or a bleached appearance. This was apparently due to the oxidizing affect of the peroxygen.

Results

During initial observations, the drumsticks treated with either 100 or 500 ppm peracetic acid did not swell or exhibit changes in either skin color or skin texture. The skin of the drumsticks treated with the 1000 ppm peracetic acid, however, was slightly bleached; while the drumsticks treated with 1% $H_2O_2$ became not only slightly bleached (albeit less than the drumsticks treated with 1000 ppm peracetic acid), but significantly bloated and textured like rubber.

The peracetic acid treated drumsticks did not change over the 24 hour observation period, and the swelling subsided in the $H_2O_2$ treated drumsticks.

With the exception of the drumsticks treated with 1000 ppm peracetic acid or 1% hydrogen peroxide, there was no difference in appearance between rinsed and unrinsed drumsticks.

EXAMPLE 2

One liter equilibrium solutions of 100 ppm PAA, 500 ppm PAA, and 1000 ppm PAA were prepared by diluting with deionized water a solution of 35% PAA, which had a nominal composition of 35.5% PAA, 6.8% $H_2O_2$, 39.3% HOAc, 1% $H_2SO_4$, 17.4% water, and 0.05% dipicolinic acid. The prepared solutions had the following approximate concentration of peracetic acid and hydrogen peroxide: 100 ppm PAA, 19 ppm $H_2O_2$; 500 ppm PAA, 95 ppm $H_2O_2$; and 1000 ppm PAA, 190 $H_2O_2$. One percent $H_2O_2$ served as a comparative and deionized water served as the control.

Nine Purdue brand chicken drumsticks were selected and treated as described in the procedure above.

Results

No color or texture changes occurred in either the skin or flesh of any drumstick relative to its deionized water control during initial observations of the rinsed and unrinsed drumsticks treated with the 100 ppm PAA, 500 ppm PAA, or 1000 ppm PAA. However, the drumsticks treated with 1% $H_2O_2$ appeared foamy, bloated and slightly bleached, and the skin of the 1% $H_2O_2$ treated drumstick felt like rubber.

Twenty-four hours after immersion, except for a slight reduction in swelling for the drumsticks that had initially been treated with 1% $H_2O_2$, no additional change in the appearance or the texture of drumsticks appeared to have occurred.

Each unrinsed peracetic acid treated drumstick had the same appearance and texture as its corresponding rinsed drumstick, while the unrinsed hydrogen peroxide treated drumstick appeared slightly more bleached and bloated than its corresponding rinsed drumstick.

Drumsticks tested in Example 1 were compared with the drumsticks tested in Example 2 that were subjected to the same concentration of peracetic acid to determine if the differences in the ratio of PAA to $H_2O_2$ had an affect on the organoleptic properties of the skin and meat. As shown in Table 1, the ratios provided in Example 1 are the inverse of the ratios provided in Example 2.

Drumsticks treated with 100 ppm PAA and 500 ppm PAA treatment solutions prepared from either 5% or 35% PAA were similar in color and texture and did not differ from the deionized water control. Samples treated with 1000 ppm PAA treatment solutions prepared from 5% PAA exhibited slight bleaching of the skin and meat when compared to the samples treated with 1000 ppm PAA treatment solutions prepared from 35% PAA or the deionized water control.

EXAMPLE 3

An equilibrium solution of 5% PAA having a nominal composition of 5.1% PAA, 21.7% $H_2O_2$, 10.4% HOAc, and 62.8% water, and 0.7% 1-hydroxyethylidene-1,1-diphosphonic acid was diluted with sufficient deionized water to make one liter each of a 100 ppm PAA, a 500 ppm PAA, and a 1000 ppm PAA solution. These diluted solutions had the following approximate concentrations of peracetic acid and hydrogen peroxide: 100 ppm PAA, 425 ppm $H_2O2$; 500 ppm PAA, 2125 ppm $H_2O_2$; and 1000 ppm PAA, 4250 ppm $H_2O_2$. A one liter solution of 1% $H_2O_2$ was used as a comparative and deionized water served as a control. The pH of each was taken and recorded.

Fifteen Purdue brand chicken drumsticks purchased from a local grocery store were selected from a package of 24 and matched as closely as possible for size and skin color. A set of three drumsticks was selected for each test with each set being completely submerged in its selected solution. The set of drumsticks was then removed from the solution at five minute intervals, immediately rinsed with deionized water, placed in individual plastic bags and refrigerated. The drumsticks were compared initially and after 24 hours to observe changes in skin and meat color, texture and evidence of bloating relative to the deionized water controls.

Results

While the drumsticks were submerged in the solutions it was noted that the 1% $H_2O_2$ treatment solution effervesced. After 7 minutes, the drumsticks in the 1% $H_2O_2$ solution floated. Effervescence and floating of the drumsticks did not occur in the peracetic acid solutions.

The drumsticks that were treated for 5 minutes in either the 100 ppm PAA or the 500 ppm PAA solutions exhibited neither visual nor tactile changes in skin color, size or texture relative to the 5 minute deionized water control. A slight bleaching of both the skin and the flesh was observed for those drumsticks treated for 5 minutes in either the 1000 ppm PAA solution or the 1% hydrogen peroxide solution. Bloating was seen and a rubbery texture felt only for the drumsticks treated with 1% hydrogen peroxide.

The drumsticks that were treated for 10 minutes in either the 100 ppm s PAA or 500 ppm PAA solutions exhibited neither visual nor tactile changes in skin color, size or texture relative to the 10 minute deionized water control. A slight bleaching of both the skin and the flesh was observed for those drumsticks treated for 10 minutes with either 1000 ppm PAA or 1% $H_2O_2$. Bloating was seen and a rubbery texture was felt only for the drumsticks treated for 10 minutes with 1% hydrogen peroxide.

The drumsticks that were treated for 15 minutes with 100 ppm PAA exhibited neither visual nor tactile changes (that is there were no changes in the organoleptic properties) in skin color, size or texture of the drumsticks relative to the 15 minute deionized water control. The remaining drumsticks that were tested in either peracetic acid or one percent hydrogen peroxide, exhibited some bleaching of the skin and meat, but, except for the one percent hydrogen peroxide application, no swelling.

EXAMPLE 4

An equilibrium solution of 35% PAA having a nominal composition of 35.5% PAA, 6.8% $H_2O_2$, 39.3% HOAc, 1% $H_2SO_4$, 17.4% water, and 0.05% dipicolinic acid was diluted with sufficient deionized water to make one liter each of a 100 ppm PAA, a 500 ppm PAA, and a 1000 ppm PAA solution. These diluted solutions had the following approximate concentrations of peracetic acid and hydrogen peroxide: 100 ppm PAA, 19 ppm $H_2O_2$; 500 ppm PAA, 95 ppm $H_2O_2$; and 1000 ppm PAA, 190 ppm $H_2O_2$. A one liter solution of 1% $H_2O_2$ served as a comparative and deionized water served as a control.

Fifteen Purdue brand chicken drumsticks were selected and treated as described in Example 3 above.

Results

While the drumsticks were submerged in the solutions it was noted that the 1% $H_2O_2$ treatment solution began to effervesce. After 8 minutes, the drumsticks in the 1% $H_2O_2$ solution floated. Effervescence and floating of the drumsticks did not occur in the peracetic acid solutions.

At the end of the first 10 minutes, drumsticks treated with either 100 ppm, 500 ppm, or 1000 ppm PAA were unchanged with respect to skin color and texture relative to the deionized water control.

At the end of the first 15 minutes, the 100 ppm and 500 ppm PAA treated drumsticks appeared unchanged and the drumsticks treated in the 1000 ppm solution exhibited very slight bleaching of the skin and meat.

At the end of each of the time periods studied here, the drumsticks treated with 1% $H_2O_2$ exhibited bleaching, bloating, and a leathery texture of the skin.

As in Examples 1 and 2, the drumsticks treated with treatment solutions prepared from 5% PAA were compared to similar drumsticks treated with solutions prepared from 35% PAA. The comparison showed that drumsticks treated with 100 ppm solution prepared from either 5% or 35% PAA were comparable to each other and the deionized water controls with respect to color, texture, and bloating. Changes in the organoleptic properties apparent in the drumsticks treated for more than 10 minutes with 500 ppm solutions prepared from 5% PAA were not apparent in the drumsticks treated with 500 ppm solutions prepared from 35% PAA even after 15 minutes. Drumsticks treated with 1000 ppm PAA solution prepared from 5% PAA exhibited changes in skin and meat color after 5 minutes of treatment ,while drumsticks treated with 1000 ppm PAA solutions prepared from 35% PAA did not exhibit changes in organoleptic properties until after 10 minutes in the treatment solution.

EXAMPLE 5

An equilibrium solution of 35% PAA having a nominal composition of 35.5% PAA, 6.8% $H_2O_2$, 39.3% HOAc, 1% $H_2SO_4$, 17.4% water, and 0.05% dipicolinic acid was diluted with sufficient deionized water to make three one liter 1000 ppm PAA solutions, each having approximately 1000 ppm PAA and 190 ppm $H_2O_2$. The pH of the first solution was not adjusted. The pH of the second solution was adjusted to pH 5 with disodium phosphate (DSP), while the pH of the third solution was adjusted to 5 with 2N NaOH. Six Purdue brand chicken drumsticks purchased from a local grocery store were selected from a package of 24 and matched as closely as possible for size and skin color. A set of two drumsticks was selected for each sample and completely submerged in its corresponding solution, from which it was removed after 15 and 30 minutes, and then rinsed with deionized water. Drumsticks were observed and compared to the unadjusted drumsticks to determine the affects, if any, of pH.

Results

After 15 minutes all the drumsticks that were tested exhibited the same very slight bleaching of the skin. After 30 minutes, all the drumsticks exhibited similar bleaching of the skin and meat, which was more pronounced than in the 15 minute study.

EXAMPLE 6

The experiment detailed in Example 5 was repeated, with the exception that the pH of each solution was adjusted to 7.

Results

The drumsticks that were treated for 15 minutes with 1000 ppm PAA and DSP did not exhibit the very slight skin bleaching apparent in the samples treated for 15 minutes in either the unadjusted or NaOH adjusted PAA solutions.

After 30 minutes, all the drumsticks exhibited bleaching of the skin and meat similar to that exhibited in Example 5.

EXAMPLE 7

An equilibrium solution of 35% PAA having a nominal composition of 35.5% PAA, 6.8% $H_2O_2$, 39.3% HOAc, 1% $H_2SO_4$, 17.4% water, and 0.05% dipicolinic acid was diluted with sufficient deionized water to make one liter of a 2000 ppm PAA solution. The diluted solution had the following approximate concentration of peracetic acid and hydrogen peroxide: 2000 ppm PAA, 380 ppm $H_2O_2$. Deionized water served as the control. Six Purdue brand chicken drumsticks purchased from a local grocery store were selected from a package of 24 matched as closely as possible for size and skin color. Three drumsticks were submerged in the test solution and three in the deionized water control. The drumsticks were removed from the solutions at 1, 5, and 10 minute intervals and immediately rinsed with deionized water. The peracetic acid treated drumsticks were then compared to the controls for changes in skin color, texture and bloating.

Results

The drumsticks that were treated for one minute in the 2000 ppm peracetic acid solution were unchanged with respect to skin and meat color and texture. No bloating was apparent. The drumsticks that were treated for 5 minutes exhibited very slight bleaching of the meat without bloating or changes in texture. The drumsticks that were treated for 10 minutes exhibited skin bleaching with more pronounced bleaching of the meat. Bloating and textural changes were not apparent.

TABLE 1

| Composition and pH of Fowl Washes Prepared from 5% and 35% Peracetic acid | | | |
|---|---|---|---|
| Source | Diluted PAA Concentration | Diluted $H_2O_2$ Concentration | pH (unadjusted) |
| 5% PAA | 100 ppm | 425 ppm | 3.3 |
| 5% PAA | 500 ppm | 2125 ppm | 3.0 |
| 5% PAA | 1000 ppm | 4250 ppm | 2.8 |
| 35% PAA | 100 ppm | 19 ppm | 3.7 |
| 35% PAA | 500 ppm | 95 ppm | 3.4 |
| 35% PAA | 1000 ppm | 190 ppm | 3.3 |
| 35% PAA | 2000 ppm | 380 ppm | 2.9 |

The examples show that effective sanitation occurs within a narrow peracetic acid concentration range of from 100 to 2000 ppm peracetic acid solution, with a 100 to 1000 ppm peracetic acid solution is more preferred, and a 100 to 750 ppm peracetic acid solution being most preferred.

As shown in the examples, a hydrogen peroxide concentration of 4000 ppm tends to adversely affect the skin of the fowl, but hydrogen peroxide concentrations of 2200 ppm or less do not. Thus, preferred concentrations of peracetic acid generally would have less than 4000 ppm hydrogen peroxide, with the more preferred concentrations of peracetic acid having 2200 ppm hydrogen peroxide or less.

Based on Table 1, using the minimum and maximum concentrations of peracetic acid and hydrogen peroxide provided for there, the peracetic acid solutions have a corresponding range of hydrogen peroxide of from 19 to 4250 for the 100 to 2000 ppm peracetic acid solution, of from 19 to 4250 for the 100 to 1000 ppm peracetic acid solution; and of from 95 to 2125 for the 100 to 500 ppm peracetic acid solution. Peracetic acid application within these ranges provides effective sanitization of the fowl; while providing substantial freedom from whitening of the skin, from bloating of the carcass, and from making a rubbery skin.

The peracetic acid used in the examples described here was prepared from commercially available equilibrium solutions peracetic acid. Such commercially prepared peracetic acid is typically an aqueous equilibrium solution prepared by reacting acetic acid and hydrogen peroxide; thus, the peracetic acid solution contains some hydrogen peroxide. Pure peracetic acid solution, which does not contain hydrogen peroxide, can also be both made and used for sanitizing fowl; however, because pure peracetic acid is unstable and subject to detonating, peracetic acid equilibrium solution containing hydrogen peroxide is generally preferred over pure peracetic acid solution.

Commercially, 5 wt % and 35 wt % peracetic acid are available; higher concentrations are not generally available, primarily, because of instability problems. As shown in Table 1, the ratio of peracetic acid to hydrogen peroxide is different for each of these stock solutions because of the differences in equilibrium conditions, but remains approximately constant for the dilutions made from a given stock solution. For example the ratio of peracetic acid to hydrogen peroxide is approximately 1:4.25 for stock 5% peracetic acid and for its dilutions, and 0.25:1 for stock 35% peracetic acid and its dilutions.

Table 2, summarizes the examples presented here. The column labeled "effective" provides the peracetic acid concentration range found to be effective for sanitizing the fowl. The column labeled "preferred" provides the peracetic acid concentration range that is preferred for sanitizing the fowl.

TABLE 2

Effective and Preferred Conditions for Fowl Washes Prepared from 5% and 35% Peracetic Acid

| | Effective | Preferred |
| --- | --- | --- |
| Solutions prepared from 5% PAA + 20 $H_2O_2$ | | |
| Diluted PAA Concentration | 100–500 ppm | 100–400 ppm |
| Diluted $H_2O_2$ Concentration | 425–2125 ppm | 425–1700 ppm |
| pH | 3–7 | 3–5 |
| Exposure Time | 30 sec–10 min | 1 min–5 min |
| Temperature | 4 C.–40 C. (40 F.–104 F.) | 10 C.–27 C. (50 F.–80 F.) |
| Solutions prepared from 35% PAA + 6.8% $H_2O_2$ | | |
| Diluted PAA Concentration | 100–2000 ppm | 100–1000 ppm |

TABLE 2-continued

Effective and Preferred Conditions for Fowl Washes Prepared from 5% and 35% Peracetic Acid

| | Effective | Preferred |
| --- | --- | --- |
| Diluted $H_2O_2$ Concentration | 19–380 ppm | 19–190 ppm |
| pH | 3–7 | 3–5 |
| Exposure Time | 30 sec–15 min | 1 min–5 min |
| Temperature | 4 C.–40 C. (40 F.–104 F.) | 10 C.–27 C. (50 F.–80 F.) |

We claim:

1. A method for sanitizing fowl that has been killed, plucked and eviscerated, comprising contacting the fowl with an aqueous peracetic acid solution, which consists essentially of a sanitizing concentration of at least a100 ppm peracetic acid suitable for sanitizing fowl without adversely affecting the fowl, and maintaining that contact for a time sufficient to sanitize the fowl without adversely affecting the fowl.

2. The method of claim 1, wherein the fowl is sanitized by complete immersion in the peracetic acid solution and the solution has from 100 to 2000 ppm of peracetic acid, 19–380 ppm hydrogen peroxide, and a pH of 3–7.

3. The method of claim 2, wherein the solution has from 100 to 1000 ppm peracetic acid, 19–190 ppm hydrogen peroxide, and a pH of 3–5.

4. The method of claim 2, wherein the solution has from 100 to 500 ppm of peracetic acid, from 425–2125 ppm hydrogen peroxide, and a pH of 3–7.

5. A method for sanitizing fowl that has been killed, plucked, and eviscerated, comprising sanitizing the fowl by spraying the fowl with an aqueous solution consisting essentially of a sanitizing concentration of at least 100 ppm peracetic acid suitable for sanitizing the fowl without adversely affecting the fowl, and maintaining contact for a time sufficient to sanitize the fowl without adversely affecting the fowl.

6. The method of claim 5, wherein the solution has from 100 to 2000 ppm peracetic acid, 19–380 ppm hydrogen peroxide, and a pH of 3–7, and the fowl is sanitized by thoroughly spraying the fowl with the peracetic acid solution.

7. The method of claim 6, wherein the solution has from 100 to 1000 ppm peracetic acid, 19–190 ppm hydrogen peroxide, and a pH of 3–7.

8. The method of claim 1, wherein the solution has from 100 to 500 ppm peracetic acid solution, from 425–2125 ppm hydrogen peroxide, and a pH of 3–7.

* * * * *

(12) EX PARTE REEXAMINATION CERTIFICATE (6683rd)
United States Patent
Kurschner et al.

(10) Number: US 5,632,676 C1
(45) Certificate Issued: Mar. 3, 2009

(54) USE OF PERACETIC ACID TO SANITIZE PROCESSED FOWL

(75) Inventors: Lisa M. Kurschner, Hamilton Square, NJ (US); George M. Diken, Hamilton Square, NJ (US)

(73) Assignee: FMC Corporation, Philadelphia, PA (US)

Reexamination Request:
No. 90/008,588, Apr. 12, 2007

Reexamination Certificate for:
Patent No.: 5,632,676
Issued: May 27, 1997
Appl. No.: 08/134,995
Filed: Oct. 12, 1993

(51) Int. Cl.
*A22C 21/00* (2006.01)
*A22C 21/04* (2006.01)
*A23L 1/015* (2006.01)
*A23L 1/315* (2006.01)

(52) U.S. Cl. .......................... 452/173; 452/74; 452/77; 426/332

(58) Field of Classification Search .................. None
See application file for complete search history.

(56) References Cited

U.S. PATENT DOCUMENTS

| | | | |
|---|---|---|---|
| 3,130,207 | A | 4/1964 | Greenspan et al. |
| 4,013,575 | A | 3/1977 | Castrantas et al. |
| 4,026,798 | A | 5/1977 | Castrantas et al. |
| 4,097,520 | A | 6/1978 | Slattery |
| 4,130,501 | A | 12/1978 | Lutz et al. |
| 4,137,256 | A | 1/1979 | Slattery et al. |
| 4,172,086 | A | 10/1979 | Berkowitz |
| 4,196,221 | A | 4/1980 | Dew |
| 4,683,618 | A | 8/1987 | O'Brien |
| 5,078,896 | A | 1/1992 | Rorig et al. |
| 5,122,538 | A | 6/1992 | Lokkesmoe et al. |
| 5,178,890 | A | 1/1993 | van den Nieuwelaar et al. |
| 5,200,189 | A | 4/1993 | Oakes et al. |
| 5,234,703 | A | 8/1993 | Guthery |
| 5,364,650 | A | 11/1994 | Guthery |
| 5,658,467 | A | 8/1997 | LaZonby et al. |

FOREIGN PATENT DOCUMENTS

| | | |
|---|---|---|
| CA | 2351259 A1 | 12/2001 |
| GB | 2255507 A | 11/1992 |

OTHER PUBLICATIONS

Quaas and Kruger, Fleisch (1980) 34(4):73–75.
Lillard and Thompson, Journal of Food Science (1983) 48:125–126.
Chance, Journal of Biological Chemistry (1949) 179–1341–1369.
Agner and Theorell, Arch. Biochem. (1946) 10:321–338.
Degussa Corporation, Premarket Approval Request to the Food and Drug Administration (FDA), dated Apr. 28, 1994.
Wofasteril 400 (40% peracetic acid solution) Safety Data Sheet.
MSDS, FMC Corporation's 15% (15/10) PAA.
MSDS, FMC Corporation's 15% (15/23) PAA.
MSDS, FMC Corporation's 5% PAA.
Proximate® 5:14 Product Data Sheet.
Stryer, L., Biochemistry, Third Ed., ® 1988, Chapter 17, W.H. Freeman & Co. New York.
Kotula et al., Beef Carcass Washing to Reduce Bacterial Contamination, Journal of Animal Science, vol. 39, No. 4 (1974).
Labadie et al., Development of a New Technique for Obtaining Axenic Meat, European J. Appl. Microbiol. 4, 67–73 (1977).
Snijders et al., Lactic acid as a decontaminant in slaughter and processing procedures, The Veterinary Quarterly, vol. 7, No. 4, Oct. 1985.
Dorn et al., Investigations on salmonella decontamination of broiler carcasses, Arch. Geflügelk. 1989, 53 (3), 123–134, © Eugen Ulmer GmbH & Co., Stuttgart.
Translation for C–1, Dorn et al., Investigations on salmonella decontamination of broiler carcasses, Arch. Geflügelk. 1989, 53 (3), 123–134, ©Eugen Ulmer GmbH & Co., Stuttgart.
Hruska et al., Fungicidal Effect of Peracetuc Acid on Meat Mocriflora, Vojenske Zdravotnicke Listy 1965, ROCNIK XXXIV (5), 215–217.
Translation for C–1, Hruska et al., Fungicidal Effect of Peracetic Acid on Meat Mocriflora, Vojenske Zdravotnicke Listy 1965, ROCNIK XXXIV (5), 215–217.
Gusev, A.A., et al., "Utilization of Peracetic Acid for Decontamination of Salmonella on the Surface of Poultry," Veterinnya Moscow, Feb. 1998, pp. 44–48.
Translation for C–3, Gusev, A.A., et al., "Utilization of Peracetic Acid for Decontamination of Salmonella on the Surface of Poultry," Veterinnya Moscow, Feb. 1998, pp. 44–48.
Bell, K.Y., et al. "Reduction of Foodborne Microorganisms on Beef Carcass Tissue Using Acedic Acid, Sodium Bicarbonate, and Hydrogen Peroxide Spray Washes," Food Microbiology, 1997 (14), 439–448.

*Primary Examiner*—Gary L Kunz

(57) ABSTRACT

A method for sanitizing a fowl that has been defeathered and eviscerated by contacting the fowl with peracetic acid solution containing from 100 to 2000 ppm peracetic acid. Completely contacting the fowl with peracetic acid solution effectively reduces the bacterial level found on the fowl to a level that will not produce disease in human beings.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–8 is confirmed.

\* \* \* \* \*